United States Patent [19]

Heckethorn

[11] 4,372,017
[45] Feb. 8, 1983

[54] U-BOLT EXHAUST SYSTEM CLAMP WITH DOUBLE SADDLE

[75] Inventor: John E. Heckethorn, Dyersburg, Tenn.

[73] Assignee: Heckethorn Manufacturing Co., Dyersburg, Tenn.

[21] Appl. No.: 188,262

[22] Filed: Sep. 17, 1980

[51] Int. Cl.³ .............................................. B01J 6/00
[52] U.S. Cl. ................................ 24/277; 285/382.2; 285/420; 24/243 R
[58] Field of Search ................. 24/277, 243; 285/420, 285/382.2, 62, 199

[56] References Cited

U.S. PATENT DOCUMENTS

| | | | |
|---|---|---|---|
| 2,993,255 | 7/1961 | Jagiel | 285/420 |
| 3,055,072 | 9/1962 | Brown | 24/277 |
| 3,605,214 | 9/1971 | Spotts et al. | 24/277 |
| 3,879,815 | 4/1975 | Dowling et al. | 24/277 |
| 3,919,747 | 11/1975 | Offterdinger | 285/199 |
| 4,063,700 | 12/1977 | Brewer | 24/277 |
| 4,147,384 | 4/1979 | Heckethorn | 24/277 |
| 4,229,863 | 10/1980 | Bowden | 24/277 |

*Primary Examiner*—Robert A. Hafer
*Attorney, Agent, or Firm*—Dennison, Meserole, Pollack & Scheiner

[57] ABSTRACT

A U-bolt saddle clamp is disclosed having a double saddle design, wherein the primary saddle web is centered on the U-bolt axis to provide a substantially complete circular indentation on the coupled pipes to which it is applied in cooperation with the U-bolt. The spaced secondary saddle web functions as a fulcrum for the actuating or primary web and is cut out higher as it does not indent the pipe.

6 Claims, 8 Drawing Figures

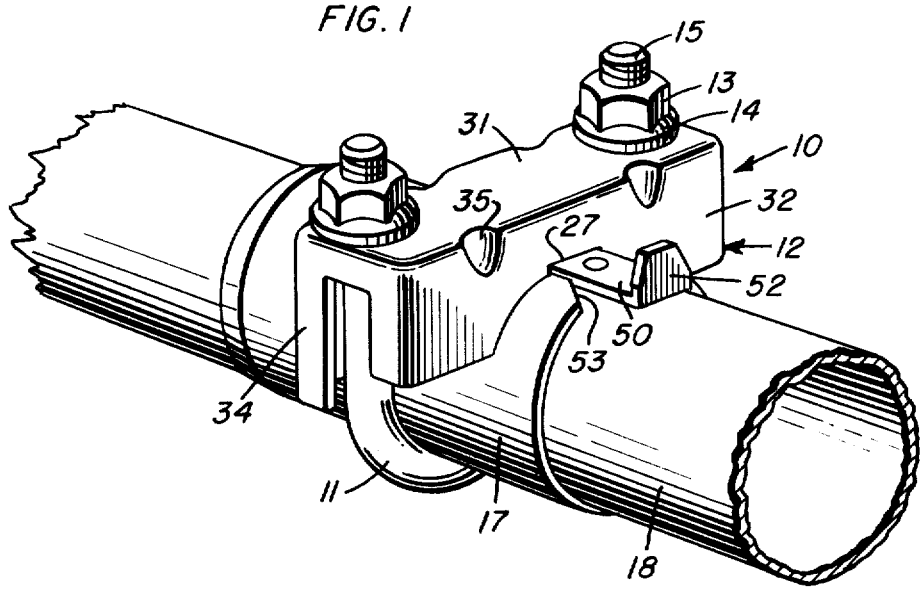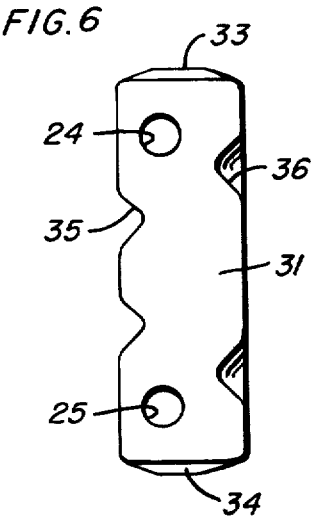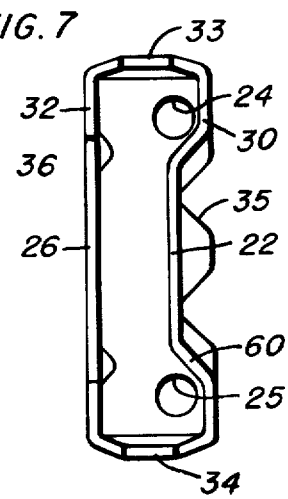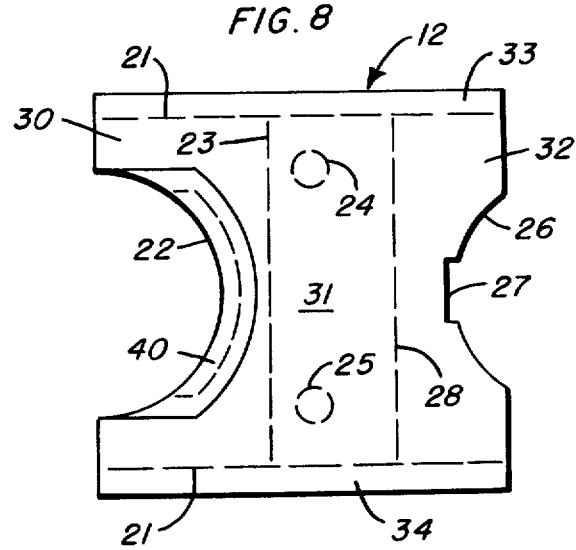

U-BOLT EXHAUST SYSTEM CLAMP WITH DOUBLE SADDLE

BACKGROUND AND PRIOR ART

The general field of this invention is the art of U-bolt saddle clamps which are conventionally employed in the exhaust systems and elsewhere in automobiles and trucks powered by internal combustion engines.

The prior art in this field is for the most part derived from a basic assembly comprising a U-shaped bolt threaded at its ends having a semicircular bight portion integrally connecting a pair of parallel legs which mount in axially slidable relation a sheet steel saddle member including tubular portions receiving and housing the bolt legs and connected by a central web extending transversely between the tubular housings and being integral therewith. The saddle usually has a pipe engaging arcuate face having a curve with the same radius as the U-bolt. Nuts are fitted on the threaded free end portions of the bolt legs which are then torqued against the adjacent ends of the tubular housings to bring the saddle and bolt together for tightly clamping a coupling of telescoped cylindrical tubes disposed between the bight of the U-bolt and the arcuate edge of the saddle member. Lock washers are sometimes interposed between the nuts and the ends of the tubular housings.

Typical examples of prior art clamp structures of this general type are illustrated by Riker U.S. Pat. No. 2,719,345; Osborn et al., U.S. Pat. No. 3,137,053; Dowling et al. U.S. Pat. 3,772,745; and Heckethorn U.S. Pat. No. 3,955,250. In these devices the saddles are formed from initially planar oblong blanks of relatively thin sheet steel. These sheets are cut, stamped and rolled or otherwise formed to provide a central web integrally connecting a pair of tubular portions arranged to slide axially on the legs of an associated U-bolt. In some cases the saddle web is formed of only a single sheet thickness; in others, such as Heckethorn, the web is formed from a pair of identical sheets joined in parallel full face contact or in laterally spaced relation as in Downing, U.S. Pat. No. 3,729,782.

In modern usage, the work or pipe engaging edge of the saddle is required to impart sufficient clamping pressure on the pipe sections to indent a semicircular bead therein. The applied clamping pressure is a function of the torque level to which the securing nuts are finally tightened when they are drawn up on the threaded ends of the U-bolt legs. Tests have shown that in prior art clamps such as Riker where the saddle webs have no longitudinal reinforcement, the saddles start to twist laterally and roll over when tightened to torque levels approaching 20 foot lbs. Clamp saddles longitudinally reinforced such as Dowling et al. successfully resist such twisting and rolling at much higher torque levels, such as 30 foot lbs. Even more rigid clamps are shown in Heckethorn U.S. Pat. No. 3,955,250 and Heckethorn Ser. No. 796,217, filed May 12, 1977, now patent no.

Double saddle U-bolt clamps have been designed and used inthe past, as for example Graham et al. U.S. Pat. No. 2,959,834; Downing, *supra;* and Brewer 4,063,700; however one of these are designed to provide a substantially 360° pipe indentation now required to obviate separation of the pipes and to ensure gas tightness. In all cases of known double saddle clamps, each saddle may, under adequate torque, impress a separate groove, not in the same plane as the U-bolt.

SUMMARY OF THE INVENTION

A U-bolt saddle clamp is provided having a new double saddle design, wherein the primary saddle web is centered on the U-bolt axis to provide a substantially complete circular indentation on the coupled pipes to which it is applied in cooperation with the U-bolt. The spaced secondary saddle web functions as a fulcrum for the actuating or primary web and is cut out higher as it does not indent the pipe. The new assembly is especially strong and rigid.

It is an object of my invention to provide a pipe joint clamp having spaced saddle webs, one of which is centered on the U-bolt axis which when properly torqued will provide a locking bead or indentation in the coupled pipes.

Another object of the invention is to provide a double saddle web U-bolt clamp, wherein one of the webs serves as a fulcrum during final nut tightening.

Yet another object of the invention is to provide a U-bolt clamp arrangement which will effect leak tight sealing engagement by means of arcuate bead indentation substantially throughout the circumference of the tubing.

A still further object of my invention is the provision of a U-bolt double saddle web clamp which may be economically manufactured in large quantities from sheet metal and rod stock, and which is simple and safe in use.

Further objects and advantages will become apparent from a consideration of the following drawings and detailed description.

DESCRIPTION OF THE DRAWINGS

FIG. 1 is a top rear perspective view of the clamp of the invention installed on a coupled section of pipe.

FIG. 6 is a top view of the saddle member per se.

FIG. 7 is a bottom view of the saddle member.

FIG. 8 is a plan view of the stamped blank from which the saddle member is formed.

DETAILED DESCRIPTION

Figure 2:
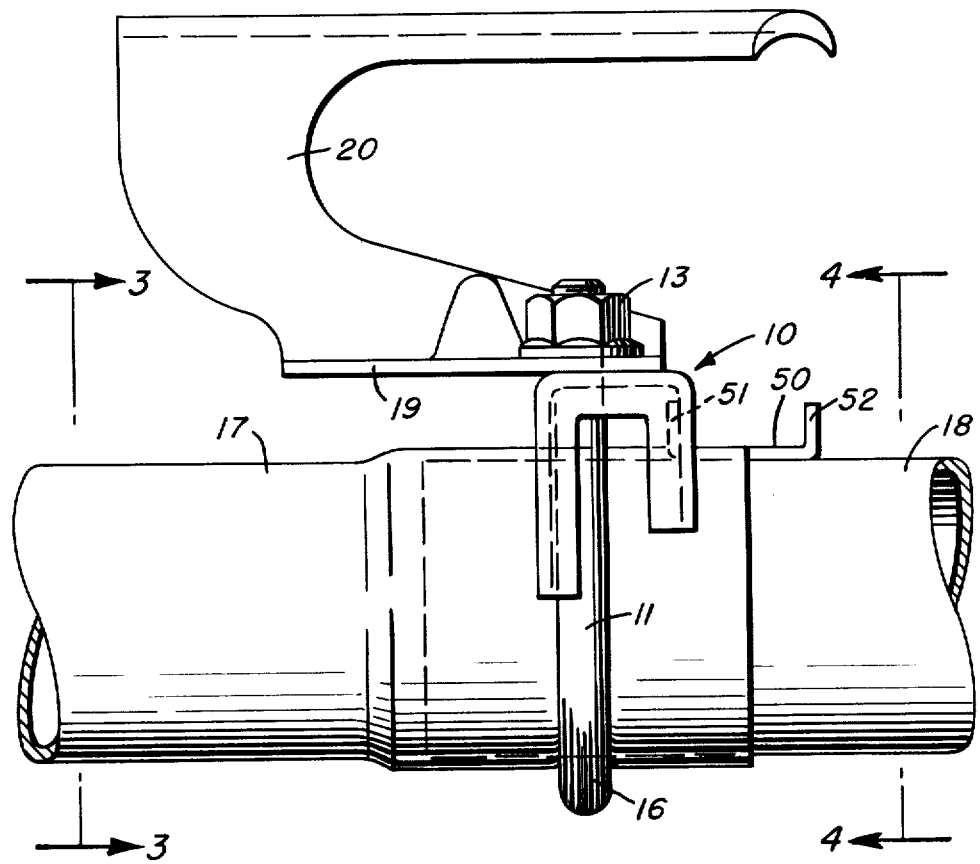
FIG. 2 is a left side view of the assembly of FIG. 1 with an optional hanger horn in place.

The invention herein disclosed is an assembly of only four parts which constitute the U-bolt clamp shown generally at 10. The component parts are a standard U-bolt 11, a special saddle member 12 and two securing nuts 13 preferably having integral washer flange portions 14. The nuts are engaged on the threaded free ends 15 of the U-bolt which extend in substantially parallel relation from the bight 16 thereof.

It will be apparent that saddle member 12 is slidable axially on the legs of the U-bolt between the nuts 13 and the bight portion 16. In operation, a coupling of telescoped pipe sections 17 and 18, one of which may be the outlet of a vehicle muffler, is compressed between the saddle 12 and the bight portion 16 of the U-bolt when the saddle is moved toward the bight under the force of the nuts 13 as they are drawn up on the legs 15.

In some applications, the U-bolt clamp assembly 10 can also serve as a hanger for one section of the exhaust system, and in such instances the ends of the U-bolt 15 pass through holes in flanges 19 of a hanger horn member 20 of conventional design which may be shock mounted to the underbody of the vehicle. This horn is not a part of the present invention but is illustrated in FIGS. 2 and 5.

The saddle member 12 can be made of any acceptable material but it has been found that 0.085" grade 950 X steel strip is well suited for use in devices of this type. This is a high strength low alloy steel and can be readily formed using various techniques. Applicant has found that forming the saddle in a progressive die has the advantage in that two pieces can be completed for each stroke of the press, therefore progressive die techniques are four times as efficient from a stamping standpoint, as for instance Heckethorn U.S. Pat. No. 3,955,250. Attention is directed specifically to the blank layout in FIG. 8. Blanking and forming of the saddle can be accomplished in seven stages in a progressive die. Initially, the primary web is stamped from an appropriate strip of material as described above. Side edges are then bent up at a 90° angle along the dotted line 21. Thereafter, the primary radius 22 is blanked and a 90° bend is made along the line 23. The bolt-receiving holes 24 and 25 are next cut into the blank. Thereafter the secondary radius 26 is blanked including the keyhole slot 27 as later described. Finally, the last bend 28 is made adjacent the secondary radius. Gussets, as later described, can be formed adjacent the lines 23 and 28 at the same time as the primary web is stamped or the first bend 23 is applied. It will be understood that as the 90° bends are made at 23 and 28, the outer flanges will be kept in confinement which will result in a heavily reinforced end structure for the saddle. The resulting saddle includes a front face 30, a top wall 31, and a rear face 32. Side walls 33 and 34 extend at right angles to the surfaces as can best be seen in FIG. 1.

In order to provide additional strength to the saddle, the front or primary face 30 is indented during the forming operation of the blank to include two stamped gussets 35. The gussets extend between the web and the nut seat at the top surface 31 and act as pillars to prevent the web from moving upwardly during the tightening sequence. Two gussets have been selected in the embodiment shown although there may be one to three, or even more, if desired. Additionally, diagonal gussets may be stamped on the top edge of the rear or secondary face 32. Note these gussets as shown at 36.

Figure 5:
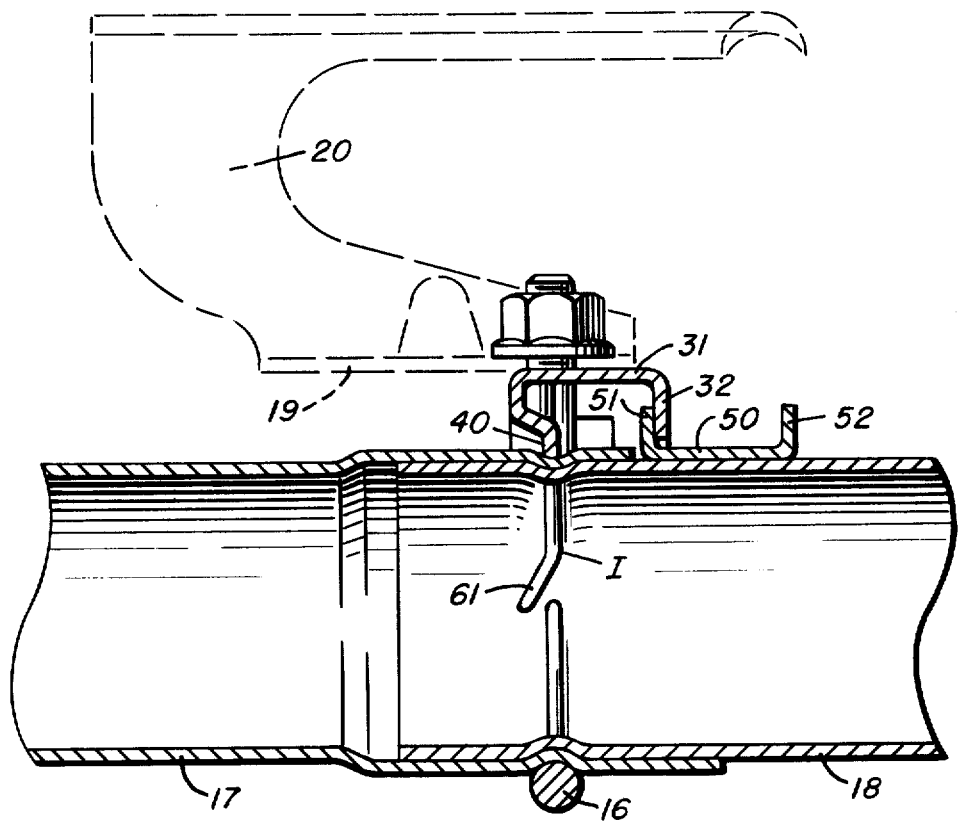
FIG. 5 is a cross-section through the pipe joint of FIG. 2 showing the pipe indentation pattern and the hanger horn being shown in dotted lines.
Figure 4:
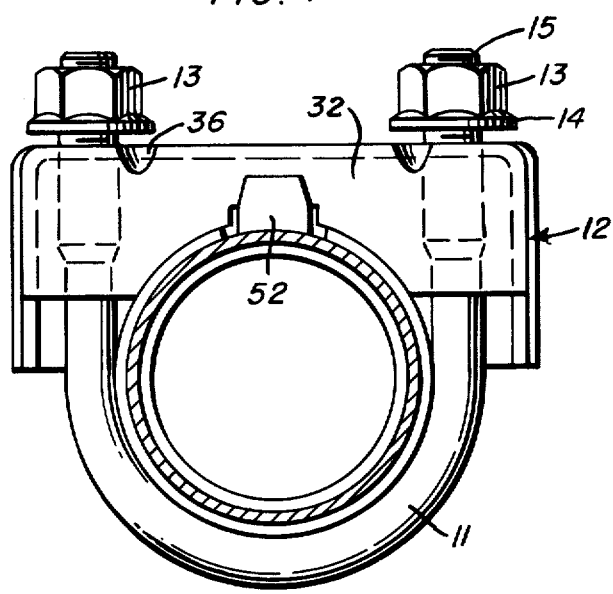
FIG. 4 is a rear view of the clamp with the hanger horn removed taken on line 4—4 of FIG. 2.

Because of the indentation formed in the blank as shown at 40 and as best seen in FIG. 5, the web and arcuate edge thereof that will be in contact with the pipe sections will lie substantially on the axis of the bolt holes 24 and 25. The U-bolt holes may be formed slightly rearwardly so that additional force can be applied to the secondary web which may be desirable when the device is used as a hanger bracket clamp. However, the U-bolt apertures 24 and 25 should never be more than 0.060 to 0.080" behind the primary web center line.

Of special importance is the fact that the center of the primary web radius 22 is located about 0.030" below the center of the secondary radius 26. When the clamp is in place, the action of the two webs will be apparent from FIG. 5 wherein the principal web 22 will provide an indentation shown at I in the pipe walls. On the other hand, the secondary web 26 located on the rear face 32 will merely contact the upper surface of the pipe and serve as a locating means and as a support or toe during and after the tightening process.

FIG. 1 shows a locating tab or shoe 50 provided with upstanding front and rear walls 51 and 52 also seen in FIG. 5. This member is welded or otherwise secured to the pipe portion 18 and is received within a mating cutout portion 53 in the pipe section 17. This tab serves as a locator member and also prevents rotation of one of the pipes with respect to the other. As previously noted, the rear face 32 of the saddle is provided with a keyhole cutout 27 to receive the tab so that the front upstanding portion 51 will rest against the inner face of the wall 32, all as shown best in FIG. 5.

In use, the U-bolt 11 is placed over the connected tubing portions which have already been properly located with respect to the tab or shoe 50 and the companion mating cutout portion 53. The saddle member 12 is placed over the U-bolt with the threaded ends 15 extending through the apertures 24 and 25 of the top wall 31 of the saddle member. If the hanger horn member such as 20 is to be used, the apertures in the flange 19 therein are also placed over the U-bolt and finally the nut members 13 are threaded thereon. It will be noted that the rear face 32 of the saddle member is located adjacent and behind the upstanding wall 51 of shoe 50. The keyhole cutout 27 passes over the shoe 50. As will be noted in FIG. 5, the wall 51 will then rest against the inner face of the rear wall 32. Upon application of appropriate torque, the bight portion of the U-bolt and the saddle member will be drawn together compressing the pipe sections therebetween so that the primary radius 22 of the front face 30 of the saddle member, which is relatively thin, will, in conjunction with the U-bolt, commence formation of an indentation I shown in FIG. 5. At this point, the radius 26 of the rear face 32 has not yet come into full contact with the tubular member 17. Upon application of sufficient torque, the final indentation is made and the radius 26 will rest upon the tubular pipe sections and serve as a toe or fulcrum.

Figure 3:
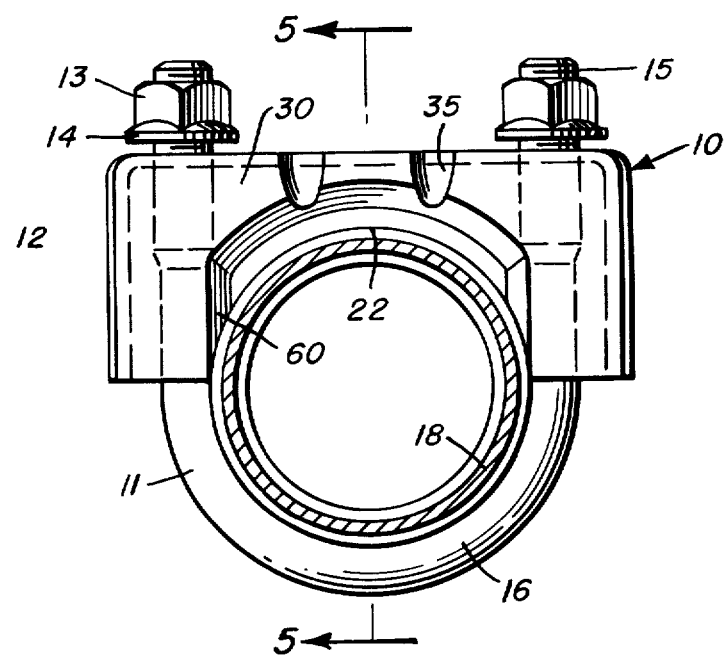
FIG. 3 is a front view of the clamp with the hanger horn removed taken on line 3—3 of FIG. 2.

As will be noted in FIG. 3, adjacent the edges of the primary radius 22, a transition portion 60 is provided. This section provides the angularly offset indentation shown at 61 in FIG. 5. It will be noted that the offset portion slightly overlaps the indentation provided by the U-bolt bight portion 16 and thereby serves to prevent leakage of exhaust gases that might otherwise seep through and between the pipe sections.

It should be appreciated that the new clamp achieves high levels of security, strength and gas tightness without the necessity for use of a sealant as is conventionally used which tends to bake under heat and to blow out of the joint. Actual tests conducted on a muffler tail pipe joint showed a nearly gas-tight seal at 25 lbs/foot nut torque with gas pressure inside the pipe at 15 psi.

I claim:

1. A U-bolt clamp assembly adapted for sealing and interlocking a pair of telescoped metal tubes to each other, said clamp assembly comprising a U-bolt and a saddle, said U-bolt having substantially parallel legs threaded adjacent the free ends thereof, and a pipe engaging radius, said saddle having a front face, a rear face parallel to and spaced from said front face, and a top wall connecting said faces, said front face having a primary pipe-engaging radius on its ower edge, said rear face having a secondary pipe-engaging radius on its lower edge, U-bolt receiving apertures in said top wall, a vertical plane through the center line of said apertures being substantially coplanar with said front face pipe-engaging radius, and nuts for engagement on the threaded ends of the U-bolt legs, whereby when applied to a pair of telescoped tubes tightening of said nuts on said U-bolt ends against said top wall will result in the front face pipe-engaging radius and said U-bolt pipe-engaging radius compressing said tubes to form a substantially circumferential indentation therein, said rear face radius bearing upon the outer of the telescoped tubes and serving as a support.

2. The clamp assembly defined in claim 1 wherein said pipe-engaging radius on said rear saddle face is located at a level above the level of the radius on said front face.

3. The clamp assembly defined in claim 1 and including side walls depending from said top wall and extending between said front and rear faces, and reinforcing said saddle member.

4. The clamp assembly defined in claim 3 and further including one or more vertical gussets embossed on the front face of the saddle member adjacent the top wall for additional support and rigidity of said saddle member.

5. The clamp assembly defined in claim 4 and further including one or more additional vertical gussets formed in said rear face adjacent its junction with said top wall.

6. In combination with a pair of telescopingly engaged metal tubes, a U-bolt clamp assembly for sealing and interlocking the tubes to each other, said clamp assembly comprising a saddle and a U-bolt, said U-bolt having substantially parallel legs threaded adjacent the free ends thereof, and a pipe-engaging radius, and nuts for engagement on the threaded ends of the U-bolt legs, the improvement comprising said saddle having a front face, a rear face parallel to and spaced from said front face, and a top wall connecting said faces, said front face having a primary pipe-engaging radius on its lower edge, said rear face having a secondary pipe-engaging radius on its lower edge, U-bolt receiving apertures in said top wall, a vertical plane through the center line of said apertures being substantially coplanar with said front face pipe-engaging radius, and wherein the inner one of said telescoped tubes is provided with a locating and rotation locking tab having an upstanding wall on the surface thereof, said outer tube having a slot formed therein receiving said tab, the rear face of said saddle member having a keyhole slot extending upwardly from the radius there of for reception of the wall of said tab, whereby tightening of said nuts on said U-bolt ends against said top wall will result in the front face pipe-engaging radius and said U-bolt pipe-engaging radius compressing said tubes to form a substantially circumferential indentation therein, said rear face radius bearing upon the outer of the telescoped tubes and serving as a support.

* * * * *